United States Patent [19]

Koehler et al.

[11] 4,075,518

[45] Feb. 21, 1978

[54] MICRO-MINIATURE STEPPING MOTOR

[75] Inventors: Dale R. Koehler, Westwood, N.J.; Robert F. Sagarino, Wheatley Heights; Charles A. Sauter, Westbury, both of N.Y.

[73] Assignee: Bulova Watch Company, Inc., New York, N.Y.

[21] Appl. No.: 698,506

[22] Filed: June 22, 1976

[51] Int. Cl.² .............................................. H02K 37/00
[52] U.S. Cl. ............................ 310/49 R; 310/40 MM; 310/156; 58/23 D
[58] Field of Search ................... 310/49, 40 MM, 268, 310/156, 41, 83, 162, 163, 164; 58/23 R, 23 D

[56] References Cited

U.S. PATENT DOCUMENTS

| | | | |
|---|---|---|---|
| 2,989,653 | 6/1961 | Wengel | 310/40 MM |
| 3,333,128 | 7/1967 | Kobayashi | 310/40 MM |
| 3,657,583 | 4/1972 | Tamaru | 310/40 MM |
| 3,795,097 | 3/1974 | Meitinger | 58/23 D |
| 3,858,308 | 1/1975 | Peterson | 310/156 |
| 3,860,842 | 1/1975 | Schwab | 310/49 |
| 3,984,709 | 10/1976 | Kuwako | 310/40 MM |
| 3,989,967 | 11/1976 | Kikuyama | 310/49 |

FOREIGN PATENT DOCUMENTS

| | | | |
|---|---|---|---|
| 2,358,040 | 5/1975 | Germany | 310/40 MM |
| 2,343,781 | 3/1974 | Germany | 58/23 D |

Primary Examiner—R. Skudy

[57] ABSTRACT

A micro-miniature stepping motor suitable for driving the gear works of an electronic watch wherein low-frequency timing impulses derived from a high-frequency time base are applied to the stator coil of the motor to cause the rotor therof to index ninety degrees in response to each impulse. The rotor includes a square rotor plate and a stator plate parallel thereto, a shaft secured to the center of the rotor plate extending through a central opening in the stator plate. Mounted on the underside of the rotor plate at the corners thereof are four permanent magnet blocks with their poles in mutual opposition to form a magnetic circuit between the rotor and stator plates whose lines of flux bridge the air gap therebetween. The stator plate has a generally square formation whereby the magnet blocks on the rotor, in the absence of a torque-producing force, seek to orient themselves to a stable position of minimum reluctance. In this position, each block is proximate to a respective corner of the stator plate, there being a series of four such stable positions which are ninety degrees apart. The stator coil has a pancake formation and is interposed in the air gap, whereby when an impulse is applied to the coil, the resultant torque displaces the rotor to cause it to index to the next stable position.

11 Claims, 7 Drawing Figures

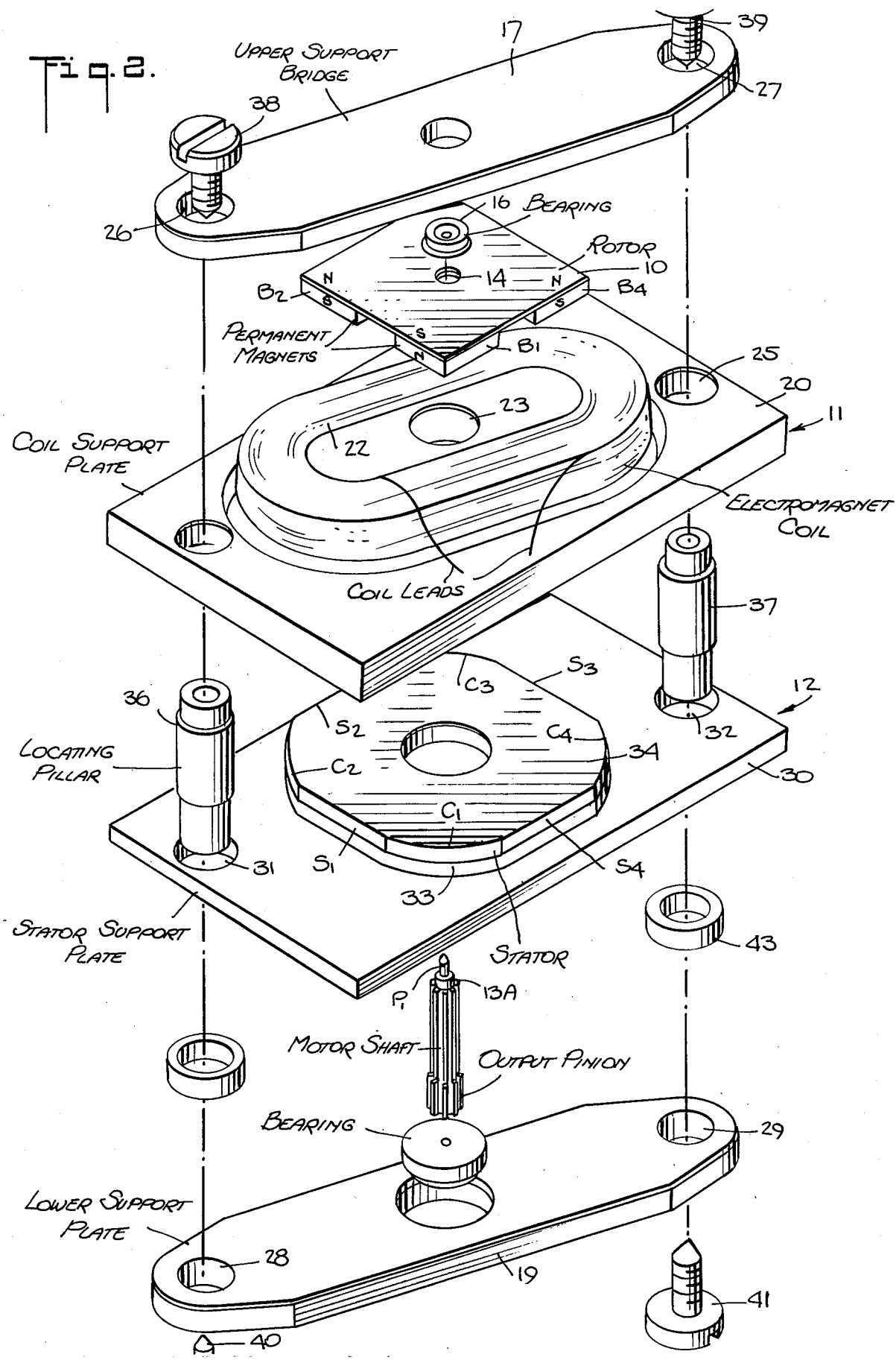

MICRO-MINIATURE STEPPING MOTOR

BACKGROUND OF INVENTION

This invention relates generally to electrical stepping motors, and more particularly to a micro-miniature stepping motor suitable for use in an electronic watch to drive a gear works for turning the time-indicating hands.

A stepping motor is one that rotates by way of short, essentially uniform angular movements rather than continuously. Typically, the steps are in 30°, 45° or 90° increments. The angular stepping action is obtained electromagnetically rather than by a ratchet and pawl mechanism as in a stepping relay.

An important application of the stepping motor is in electronic watches having an analog display formed by rotating hands. In an electronic watch of this type, low-frequency timing pulses are derived by frequency division from a high-frequency crystal-controlled time base. These timing pulses serve to actuate a stepping motor which drives the gear works rotating the hands of the watch.

In the context of an electronic watch, the stepping motor must not only be in micro-miniature form to minimize space requirements, but its power consumption must be extremely low so as to conserve power. In order to energize the watch with a miniature power cell which will last at least a year, the allowable power consumption is usually less than 8 microwatts.

Various types of stepping motors are known which make use of a permanent magnet rotor that cooperates with one or more stator coils to which actuating pulses are applied. thus in the prior U.S. Pat. No. 3,731,125 of Nickaldo, the rotor is formed by a permanent magnet disc that is slotted to define a circular series of magnet poles of alternate polarity. A pawl and detent is necessary in this motor to prevent backward motion of the rotor. Similarly, in the U.S. Pat. No. 3,818,690 to Schwartzschild, a pulsed stepping motor incorporates a mechanical detent for holding the rotor in a stable position, the rotor being advanced from one stable position to another by d-c pulses whose duration is sufficient to overcome the detent action.

The use of a mechanical detent in a stepping motor not only complicates and enlarges its physical structure, but it also imposes heavier power requirements thereon. Moreover, the use of a detent introduces structural asymmetries which render the motor more sensitive to external accelerations.

It has been recognized that a critical factor involved in the design of micro-miniature stepping motors for watches worn on the wrist is the sensitivity of the motor to external acceleration forces resulting from wrist movement. These movements at times may be be very rapid and abrupt. On one hand, it is desirable that the motor consume as little power as possible consistent with the requirement that sufficient torque be produced to drive the gear train and whatever other mechanisms are included in the watch, such as a calendar mechanism. On the other hand, it is important that the motor should not be affected by shock and other external accelerative forces that tend to advance the gear train, for then inaccuracies will be introduced in the timing.

The moment of inertia of a body, such as a stepping motor, depends upon the distribution of the masses of its component parts. If the distribution is asymmetrical, then an acceleration force gives rise to a torque that may be sufficient to turn the rotor. One can prevent external acceleration forces from turning the rotor of a stepping motor by so detenting the motor that these forces are insufficient to overcome the detent action. But the usual detent for this purpose has two disadvantages. First, the detent may itself introduce asymmetry, rendering the motor more sensitive to acceleration forces. Second, the strength of the detent is such that in order to diminish the sensitivity of the motor to acceleration forces, it requires a measurably greater input power to overcome the detent in order to step the rotor.

SUMMARY OF INVENTION

In view of the foregoing, it is the main object of this invention to provide an improved micro-miniature stepping motor useful for driving the gear train of an electronic watch or for any other practical application reqiuiring a motor having the advantages of the present invention.

More particularly, it is an object of this invention to provide a motor of exceptionally simple design which may be mass-produced at low cost, the motor being characterized by a magnetic detenting action affording four equi-spaced stable positions, whereby when the motor is actuated, the rotor indexes from one stable position to the next.

Also an object of this invention is to provide a micro-miniature motor which has extremely low power requirements and consumes no more power than is necessary to momentarily overcome a magnetic detenting action to cause the rotor to step from one stable position to the next.

A significant feature of the invention resides in a symmetrical magnetic detenting arrangement in which four permanent magnet blocks supported at the corners of a square rotor plate seek to orient themselves at a stable position of minimum reluctance with respect to the corners of a generally-square stator plate in parallel with the rotor plate, whereby when the rotor is displaced by a torque force derived from an input pulse from one stable position, the magnet blocks then move in the direction of the next stable position; and when the blocks reach a point where they are closer to the next set of corners than to the previous set, the force causing the rotor to continue its movement to the next stable position is derived from the magnetic circuit between the plates and not from the input pulse.

Still another object of this invention is to provide a physically symmetrical micro-miniature stepping motor which is substantially insensitive to acceleration, so that the accuracy of a watch incorporating the motor is not adversely affected by shocks and other acceleration forces.

Briefly stated, these objects are attained in a micro-miniature motor which includes a square rotor plate and a parallel stator plate having an air gap therebetween occupied by a pancake coil to which actuating pulses are applied, a shaft secured to the center of the rotor plate passing through a central opening in the stator plate which is surrounded by the coil.

Mounted on the underside of the rotor plate at the corners thereof are four permanent magnet blocks, the rotor and stator plates being formed of ferromagnetic material such as soft steel to produce a magnetic circuit whose lines of magnetic flux bridge the air gap.

The stator plate has a generally square form, whereby in the absence of torque produced by applying a pulse to the coil, the magnetic blocks tend to orient themselves to a stable position of minimum reluctance proximate to the then nearest corners of the stator plate. When a pulse is applied to the coil, the resultant torque displaces the rotor plate to cause the magnet blocks to approach the next set of corners, and the blocks then seek the next stable position whereby the rotor is caused to index ninety degrees each time a pulse is applied.

OUTLINE OF DRAWING

For a better understanding of the invention as well as other objects and further features thereof, reference is made to the following detailed description to be read in conjunction with the accompanying drawings, wherein:

FIG. 2 is an exploded view of the motor structure;

Figure 5:
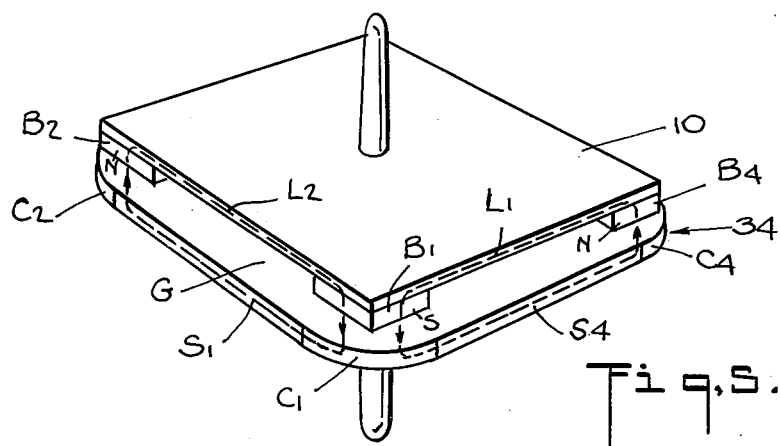
Figure 6:
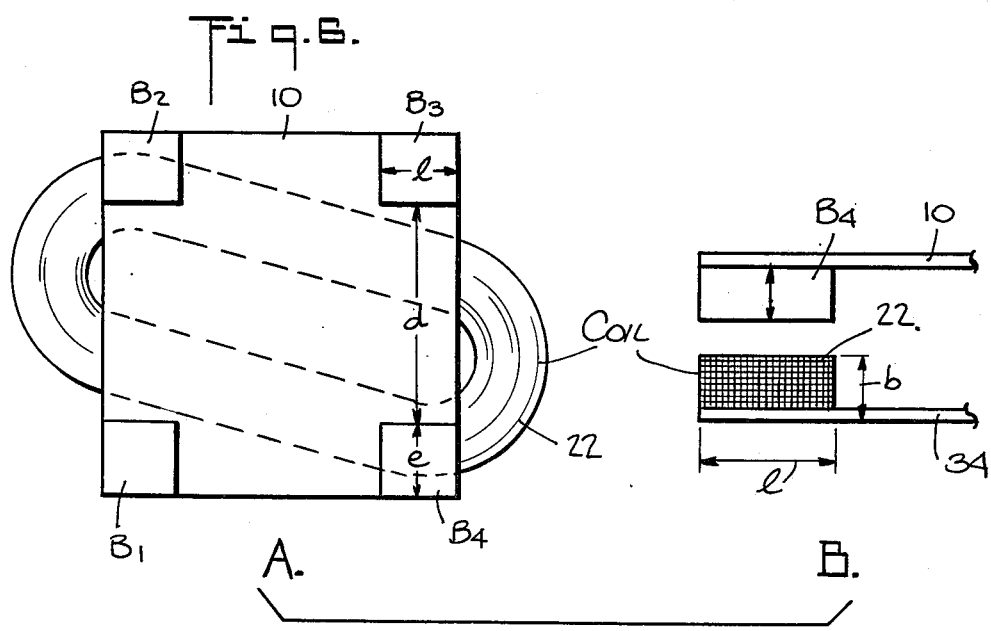

FIG. 5 schematically illustrates the magnetic circuits which are formed by the rotor and stator; and FIGS. 6A and B illustrate the relationship between the stator coil and the rotor magnets.

DESCRIPTION OF INVENTION

Motor Structure

Referring now to FIGS. 1 to 4, the main components of the micro-miniature stepping motor in accordance with the invention are a rotor generally indicated by numeral 10, a coil assembly 11, and a stator assembly 12.

Figure 3:
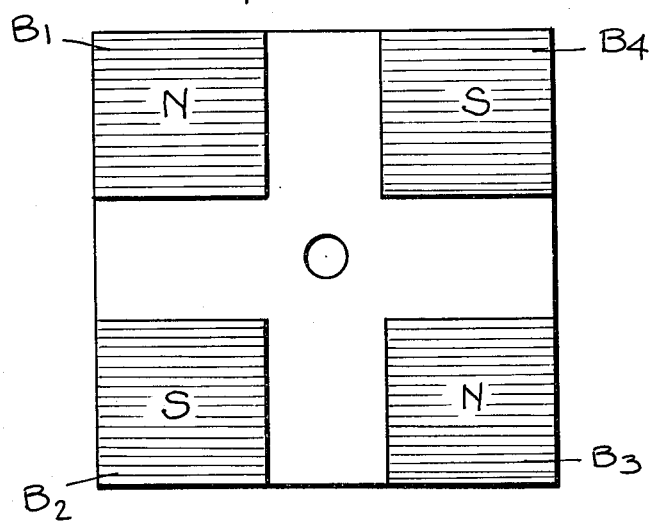
FIG. 3 is a plan view of the underside of the rotor of the motor.

Rotor 10 is constituted by a square plate of ferromagnetic material, such as soft iron or steel, and four tiny permanent magnet blocks $B_1$, $B_2$, $B_3$ and $B_4$ in square form, the blocks being secured to the underside of plate 10 at the four corners thereof. As best seen in FIG. 3, the poles of the magnet blocks are in mutual opposition, so that the North pole of block $B_1$ is exposed, the South pole of block $B_2$ is exposed, the North pole of block $B_3$ is exposed, and the South pole of block $B_4$ is exposed.

Rotor 10 is mounted on a motor shaft 13 which is longitudinally fluted. The shaft at its upper end is provided with a cylindrical section 13A which is received within a central bore 14 in rotor plate 10, the upper end terminating in a bearing pin $P_1$. The lower end of the shaft has an output pinion 15 formed thereon and terminates in a bearing pin $P_2$.

To support the shaft for rotation, pin $P_1$ is received in a bearing 16 socketed within an upper support bridge 17, while pin $P_2$ is received in a bearing 18 held within a lower support bridge 19. Pinion 15 is associated with the first wheel in a gear train (not shown) for operating the hands of a watch, or for any other purpose for which the stepping motor is useful.

Coil asssembly 11 is constituted by a rectangular support plate 20 having an oblong well 21 formed therein, within which is seated a pancake coil 22 having the same configuration, the coil being cemented or otherwise secured to the bed of the well. Plate 20 is provided with a center bore 23 through which shaft 13 is extended.

Figure 4:
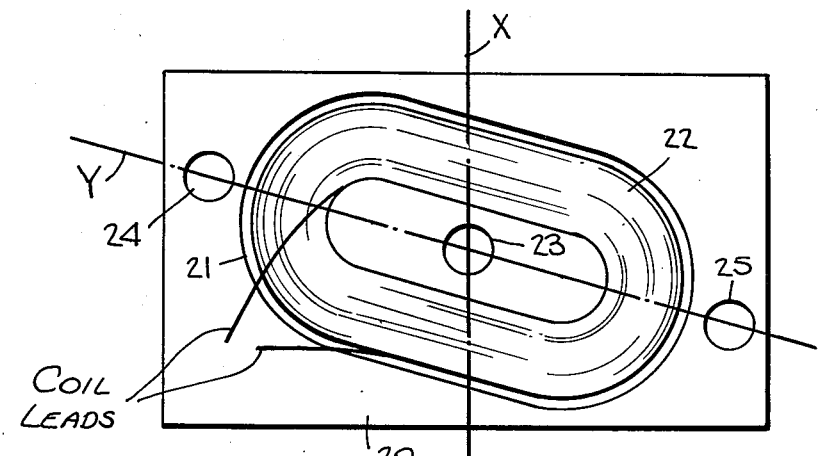
FIG. 4 is a plan view of the stator coil assembly.

As shown in FIG. 4, the center of coil 22 coincides with bore 23, but its longitudinal axis Y is slanted with respect to the transverse axis X of support plate 20 which passes through the center of the plate. Hence coil 22 is skewed relative to the sides of support plate 20. Plate 20 is provided with mounting holes 24 and 25 which are intersected by skew axis Y and are located adjacent the short ends of the plate. These holes register with holes 26 and 27 in upper support bridge 17 and corresponding holes 28 and 29 in lower support bridge 19.

Stator assembly 12 is formed by a rectangular stator support plate 30 having the same length and width as the coil support plate 20 and having mounting holes 31 and 32 in registration with the mounting holes in the coil-support plate. Seated within a well 33 in support plate 30 and cemented thereto is a stator 34 of ferromagnetic material, preferably of soft iron or steel. The well and the stator seated therein have a generally square form but with chamfered corners $C_1$, $C_2$, $C_3$ and $C_4$. The sides $S_1$, $S_2$, $S_3$ and $S_4$ of stator 34 are parallel to the corresponding sides of stator support plate 30, stator 34 being centered on this plate and having a central bore 35 which is coincident with a central bore in support plate 30 to admit rotor shaft 13 therethrough.

The components of the motor are held together in parallel relation by locating pillars 36 and 37 which are interposed between coil support plate 20 and stator support plate 30. The pillars are provided with threaded bores to receive a first pair of screws 38 and 39 which pass through bores 26 and 27 in upper bridge 17, and a second pair of screws 40 and 41 which pass through bores 28 and 29 in lower bridge 19. Spacer rings 42 and 43 are interposed between stator support plate 30 and lower bridge 19.

Figure 1:
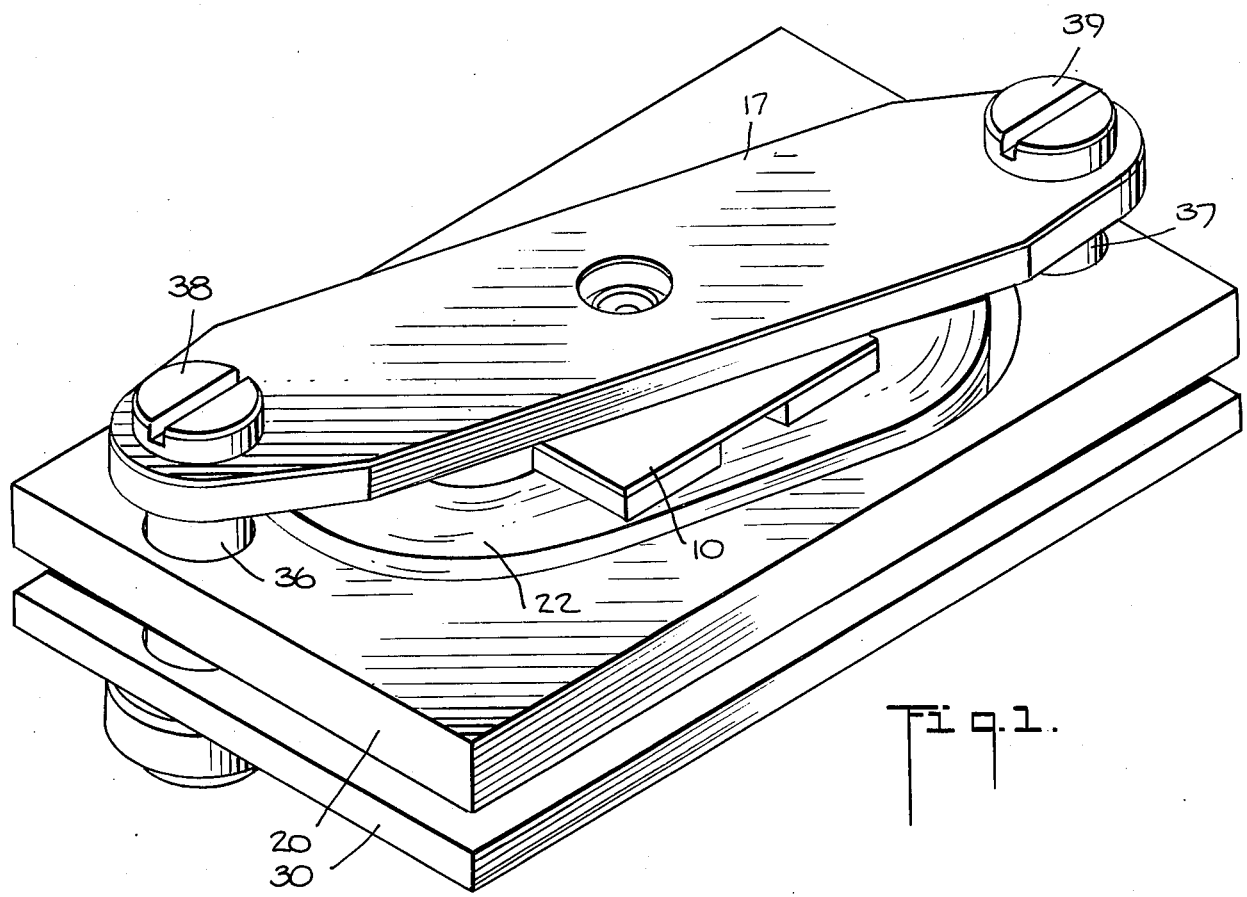
FIG. 1 is a perspective view of a micro-miniature stepping motor assembly in accordance with the invention.

Thus when the motor is assembled, the support plates for the coil and stator are, as shown in FIG. 1, in registration with each other, whereas the upper and lower bridges and the coil are skewed at the same angle with respect to the support plates.

Magnetic Detent

Referring now to FIG. 5, there is schematically shown stator 34 and rotor 10 of the motor in order to illustrate the magnetic circuit created thereby. This figure illustrates the first of the four stable positions in which magnet blocks $B_1$, $B_2$, $B_3$ and $B_4$ are respectively aligned with the rounded corners $C_1$, $C_2$, $C_3$, and $C_4$ of stator 34. The second stable position is one wherein magnet block $B_1$ is aligned with corner $C_2$. In the third stable position, magnet block $B_1$ is aligned with corner $C_3$, and in the fourth stable position, magnet block $B_1$ is aligned with corner $C_4$.

In the first stable position shown, the resultant magnetic circuit is constituted by four loops, two of which are shown by dotted lines. The lines of flux of the first loop $L_1$ pass across air gap G between magnet block $B_1$ and stator corner $C_1$; then they extend across side $S_4$ of stator 34; and from corner $C_4$ they traverse the air gap to join block $B_4$, from which point they extend across rotor 10 to meet block $B_1$, thereby completing the loop. The second loop $L_2$, which takes in blocks $B_1$ and $B_2$ and corners $C_1$ and $C_2$, has an identical form. The third loop involves blocks $B_2$ and $B_3$, and the fourth loop involves $B_3$ and $B_4$, these being the same as the other loops.

The four stable positions of rotor 10 represent conditions of minimum reluctance. Reluctance is a measure of opposition presented by magnetic flux in a magnetic circuit. Reluctance is the reciprocal of permeance and is therefore equal to magnetomotive force divided by magnetic flux. If, therefore, the rotor is subjected to a torque force to displace it from one stable position, when the torque force ceases, the rotor will then seek the next of the four stable positions.

That is to say, if a torque force resulting from the application of an electrical impulse to stator coil 22 causes magnet block $B_1$ to shift from its alignment with stator corner $C_1$ to a position closer to corner $C_2$, block $B_1$ will then move into alignment with corner $C_2$. Thus the arrangement provides a magnetic detenting action which is free of all mechanical expedients for maintaining a stable condition.

Typical dimensions for a micro-miniature motor in accordance with the invention are as follows:

A. Rotor plate 10 is 3.8 mm square and 0.12 mm thick.

B. Stator plate 34, which has rounded corners, is 0.35 mm thick and has a diameter of 6 mm, the length across the flats being 5.5 mm.

C. Magnet blocks $B_1$ to $B_4$ are 0.30 mm thick and 1.4 mm square.

D. The air gap between the magnet blocks and the stator plate is 1.15 mm, the distance between adjacent blocks being 1 mm.

Acceleration Effects

A critical factor involved in the design of a microminiature stepping motor for a wristwatch is the sensitivity of the motor to external accelerations. Since the watch is powered by a miniature battery, in order to prolong its effective operating life, it is essential that the power consumption of the motor be extremely low. Yet the motor, despite its small power consumption, must produce sufficient torque to drive gear trains, calendars, and whatever other driven mechanisms are incorporated in the watch. And the motor must not only satisfy the requirements of low power consumption and adequate torque, but it should be substantially immune to shock forces. That is to say, no advancement of the gear train should result from external accelerative forces.

Ideally, a balanced system should not respond to linear accelerations. But in practice, angular accelerations can be transmitted to balanced rotating elements of a miniature motor and cause rotational motion. It therefore is incumbent upon the motor designer to minimize the effects of such forces on the system.

Let us consider the angular acceleration $\ddot{\theta}$ acting on the rotor of moment of inertia J and also consider the restraining torque $\tau$ created by the motor transducer holding the rotor. It is desirable that the acceleration torque $J\ddot{\theta}$, be less than or equal to the restraining torque $\tau$. This is expressed by:

$$J\ddot{\theta} \leq \tau$$

Furthermore, to render the system as insensitive as possible to these shocks, it is desirable that acceleration $\ddot{\theta}$, for which this inequality is to hold, be as large as possible, which means that the above expression should be maximized.

Recognizing that the driving torque is essentially a direct function of the restraining torque, we can write for the quantity to be maximized KI$r$/J, where K is the electromechanical coupling factor for the rotor transducer, I is the instantaneous current in the coils of the transducer and $r$ is the effective radius at which the force K · I is applied.

For the microminiature stepping motor of the type disclosed herein, the time interval during which the current is applied is negligibly short compared to the time interval during which no current is applied. Hence there is no need to take into account deleterious behavior resulting from shock transients while the motor is being pulsed or stepped, for such effects are rarely encountered.

The desideratum is that the rotational energy imparted to the system from the rotational acceleration be insufficient to cause advancement of the gear train. This is stated mathematically as follows:

$$\frac{J}{2}\left[\int_o^{t_i} \ddot{\theta} dt\right]^2 \leq \int_o^{\theta_o} T d\theta,$$

where $t_i$ is the time extent of the shock perturbation and $\theta$ is the angle of rotation necessary to cause gear train advancement. If $\tau$ is of the form $K\theta$, then we have $$\frac{J}{2}\dot{\theta}^2 \leq \frac{K}{2}\theta_o^2.$$

But from the equation of motion of the rotor, $$\theta_o = \frac{KIr}{J\omega_o^2} \text{ and } \omega_o^2 = \frac{K}{J}.$$

Therefore, we can write $$\frac{K\theta_o^2}{J} \geq \dot{\theta}^2 \text{ or,}$$

$$\omega_o^2 \left(\frac{KIr}{J\omega_o^2}\right)\theta_o \geq \dot{\theta}^2 \text{ or finally}$$

$$\theta_o \geq \dot{\theta}^2 \left(\frac{J}{KIr}\right)$$

From inspection, it becomes evident that to minimize the effect of a given induced shock velocity we must maximize the quantity KI$r$/J.

The other requirements concurrently imposed on the system are that current consumption must be minimized and the torque available to the gear train must be maximized. Since these two requirements are incompatible, one must make a final engineering design decision as to what values of current and motor torque are acceptable.

To satisfy these requirements, the motor in accordance with the invention is constituted by a unidirectional rotating system having magnetic holding forces devoid of any mechanical detent expedients. The motor operates by the application of an electrical torque causing rotation with subsequent stopping at the next of four equilibrium positions by the action of the magnetic holding force. The electrical torque generated by applying a current pulse to the coil of the motor should be of such duration as to ensure sufficient energy and therefore subsequent angular motion as to cause advancement of the gear train.

A simple flat (in the plane of the watch) or horizontal coil 22 is used in conjunction with a vertical magnetic field structure generated by square rotor magnets and a stationary flux-return stator. The square magnet construction is chosen for simplicity, low cost, and necessary symmetry. The vertical dimension associated with the flux gap and coil thickness is fixed, a priori, from watch thickness considerations. These constraints then reduce the design process to one of optimizing the areal dimensions $l$ (length) and width of the magnet which in turn determines the areal extent of the rotor, flux return stator, and coil assembly.

We shall now consider FIGS. 6A and B which illustrate the rotor assembly with its square magnets. The coil in gap G is such that the torque is given by:

$$T = F \cdot \left(\frac{l+d}{2}\right) \cdot 4$$
$$= B\,nl\,I\,(l+d)\,2$$

where
$n = (b \cdot l)/a$,
$a$ = wire cross-sectional area,
$b$ = coil form height
$B$ = magnetic field strength, and
$I$ = current in wire.
Also $$J = 4M\left[\left(\frac{l+d}{2}\right)^2 + \left(\frac{l+d}{2}\right)^2\right] = 2M(l+d)^2$$

where
$M$ = mass of magnet = $\rho l^2 t$ and
$\rho$ = density of magnet and where we have neglected the rest of the rotor mass.
We therefore have $$\frac{T}{J} = \frac{2\,B\,nl\,I\,(l+d)}{2\,\rho l^2 t\,(l+d)^2} = \frac{B\,I\,b}{\rho a\,t} \cdot \frac{1}{(l+d)}.$$

Maximum current (I) along with small diameter wire ($a$) and a thin magnet ($t$) with a large air gap ($b$) used in conjunction with a small areally extending rotor ($l + d$) leads to maximization of $T/J$.

By inspection of the $T/J$ equation, we see that a judicious choice of magnet material can lead to further maximization through an increase of the ratio $B/\rho$. Samariumcobalt magnets are an excellent choice in this regard, superior to either the Alnico family or platinum-cobalt. Prototype motors with a $T/J$ equal to $10^4$ radians per second have been built while simultaneously achieving torque values of $10^{-6}$ newton-meter within a motor volume of 3 by 5 by 2 millimeters.

While there has been shown and described a preferred embodiment of a micro-miniature stepping motor in accordance with the invention, it will be appreciated that many changes and modifications may be made therein without, however, departing from the essential spirit thereof. Thus the rotor plate need not be square but may be circular, and the magnet piece need not be box-like blocks but may be in the form of circular drums. But the magnets must be placed at positions on the rotor plate corresponding to the corners of a square as to seek alignment with the corners of the stator plate.

We claim:

1. A stepping motor for driving the gear train of a watch movement, said motor comprising:

A. a rotor formed by a plate mounted on a shaft passing through its center, and a set of four like permanent magnet pieces attached to the underside of the plate at positions corresponding to the corners of a square whose diagonals intersect said center, the magnetic poles of said pieces being in mutual opposition;

B. a generally square stator plate disposed in parallel relation to said rotor plate to define an air gap therebetween, said stator plate having a central opening through which said shaft extends, said plates both being formed of ferromagnetic material, thereby creating, when the pieces of the rotor are aligned with the corner of the stator plate, a symmetrical magnetic circuit of four flux loops, each loop having lines of flux which pass through said rotor plate between a respective pair of adjacent pieces and bridge the air gap between said pieces and said stator plate, the loop being completed by lines of flux passing through said stator plate, said pieces in the absence of a torque applied to said rotor being aligned with the corners of said stator plate at positions of minimum reluctance, whereby said rotor has four stable positions;

C. a planar coil disposed in said gap in parallel relation to said plates, said coil being formed to produce a magnetic field which is asymmetrical relative to said symmetrical magnetic circuit; and D. means to apply an electrical impulse to said coil to produce said asymmetrical magnetic field to cause said rotor to step from one stable position to the next.

2. A motor as set forth in claim 1, wherein said rotor plate has a square form and said pieces are square blocks secured to the corners of said plate.

3. A motor as set forth in claim 1, wherein the corners of said stator plate are rounded.

4. A motor as set forth in claim 1, wherein the end of said shaft which extends through said opening in said stator plate has a pinion formation adapted to engage a wheel of said gear train.

5. A motor as set forth in claim 1, wherein said coil is a pancake coil having an oblong formation whose longitudinal axis is skewed with respect to said stator plate.

6. A motor as set forth in claim 5, wherein said coil is seated in the well of a support plate.

7. A motor as set forth in claim 6, wherein said stator plate is seated in the wall of a support plate.

8. A motor as set forth in claim 7, further including a pair of bridges, one above said rotor plate and the other below said stator-support plate, said bridges accommodating bearings for receiving the ends of said shaft.

9. A motor as set forth in claim 1, wherein said plates are formed of soft steel.

10. A motor as set forth in claim 1, wherein said pieces are fabricated of samarium-cobalt.

11. A motor as set forth in claim 1 having a volume of about 3 × 5 × 2 mm.

* * * * *

UNITED STATES PATENT OFFICE
CERTIFICATE OF CORRECTION

Patent No. 4,075,518    Dated  February 21, 1978

Inventor(s) Dale R. Koehler, Robert F. Sagarino and Charles A. Sauter

It is certified that error appears in the above-identified patent and that said Letters Patent are hereby corrected as shown below:

Column 2, line 17 "reqi" should have read -- re- --

Column 2, line 18 "uiring" should have read -- quiring --

Column 5, line 49 " $\leq$ " should have read -- $\leq$ --

Column 6, line 10 " $\leq$ " should have read -- $\leq$ --

Column 6, line 14 "$\theta$" should have read -- $\theta_o$ --

Column 6, line 28 " $\geq$ " should have read -- $\geq$ --

Column 6, line 17 " $\leq$ " should have read -- $\leq$ --

Column 6, line 32 " $\geq$ " should have read -- $\geq$ --

Column 6, line 35 " $\geq$ " should have read -- $\geq$ --

Column 7, line 14 "(b.1)" should have read -- b.1 --

Signed and Sealed this

Twentieth Day of June 1978

[SEAL]

Attest:

RUTH C. MASON
Attesting Officer

DONALD W. BANNER
Commissioner of Patents and Trademarks